Nov. 24, 1953        H. M. GEYER        2,660,028
DUAL DRIVE ACTUATOR
Filed Dec. 5, 1952

INVENTOR.
HOWARD M. GEYER
BY
Willits, Hardman and Felt
ATTORNEYS

Patented Nov. 24, 1953

2,660,028

UNITED STATES PATENT OFFICE 2,660,028

DUAL DRIVE ACTUATOR

Howard M. Geyer, Dayton, Ohio, assignor to General Motors Corporation, Detroit, Mich., a corporation of Delaware Application December 5, 1952, Serial No. 324,275

13 Claims. (Cl. 60—6)

1

The present invention relates to actuators, and more particularly, to actuators adapted to be operated by two separate motivating means.

In actuators designed for operating control surfaces and other aircraft equipment, the desirability of providing two independent motivating means for operating the actuators is obvious. In addition, aircraft actuators preferably embody releasable locking means, automatically operable to maintain the movable actuator element, and perforce the load device associated therewith, at a fixed position when the motivating means are inactive. The instant actuator employs fluid under pressure as the primary motivating means and electro-motive force as the secondary for auxiliary motivating means. The auxiliary motivating means is only utilized if and when the primary motivating means fails or is otherwise rendered inoperative. Accordingly, one of my objects is to provide a locking actuator with primary and secondary means for effecting operation thereof.

The aforementioned and other objects are accomplished in the present invention by releasing the locking means upon actuation of the primary motivating means, and maintaining the locking means effective or engaged upon actuation of the auxiliary motivating means. Specifically, the actuator includes a cylinder and a piston mounted for linear movement therein in either direction. The piston includes a rod that projects through an end wall of the cylinder, the rod being adapted for connection to either a relatively fixed support or a relatively movable load device. The opposite end wall of the cylinder is likewise adapted for connection to either the support or the load device, such that upon relative movement between the piston and cylinder, the load device will be positioned. Rotatably journaled within the cylinder is a screw shaft having operative connection with the piston through the well known ball-nut assembly whereby relative rotation between the nut and shaft will occur upon linear movement of the piston.

The piston is formed as a cup-shaped member to accommodate a nut which is journaled for rotation therein. The nut has an annular shoulder connected through straight splines with a locking collar. Consequently, relative axial movement may occur between the locking collar and the nut, but relative rotary movement therebetween is precluded. An annular friction surface is secured to the bottom wall of the cup-shaped piston, in alignment with an end face of the locking collar. The locking collar is normally spring urged into engagement with the friction surface whereby rotation of the nut is restrained by the locking means constituted by the collar and friction surface as the piston cannot rotate within the cylinder. A tubular member, attached to the collar, extends coaxially within the hollow piston rod, the tubular member being mounted for longitudinal movement relative thereto upon actuation of a lock release piston.

During fluid pressure operation of the actuator, the locking means are preferably released concurrently with the application of pressure fluid to one of the cylinder chambers, whereupon the locking collar will be disengaged from the friction surface. As the screw shaft is normally restrained from rotation, linear movement of the piston may be effected by pressure fluid in either direction inasmuch as the nut is free to rotate relative to the screw shaft. If for any reason, the fluid pressure system should become inoperative, the actuator piston and the load device may be adjusted by operation of the auxiliary motivating means constituted by a reversible electric motor. Upon energization of the motor, the screw shaft is rotated, while the nut is restrained from rotation by the engaged or effective locking means. Thus, relative rotation between the nut and screw shaft will effect linear movement of the nut and piston assembly to thereby adjust the load device.

Further objects and advantages of the present invention will be apparent from the following description, reference being had to the accompanying drawing wherein a preferred embodiment of the present invention is clearly shown.

Figure 1:
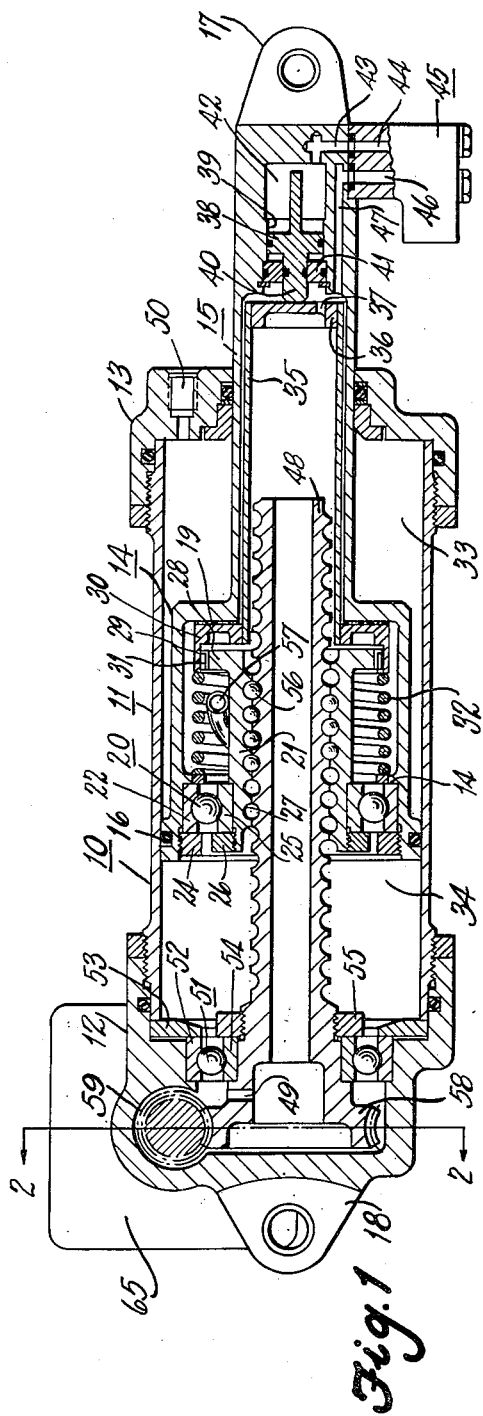
Fig. 1 is a longitudinal view, partly in section and partly in elevation, of a dual drive actuator.

With particular reference to Fig. 1, an actuator, designated generally by the numeral 10, is shown including a cylinder 11 having attached thereto end cap members 12 and 13. Disposed within the cylinder 11 is a piston 14 having an auxiliary extending rod 15 projecting through cap member 13. Both the end cap members 12 and 13 threadedly engage opposite ends of a tubular member constituting the side walls of the cylinder 11. Suitable resilient seals are interposed between contiguous surfaces of the cap members and the tubular member forming the cylinder to prevent leakage of fluid from the interior of the cylinder. The piston 14 is provided with a seal 16, which insures fluid tight engagement between the circumferential surface of the piston and the inner surface of the cylinder walls defined by the tubular member. The free end of the piston rod 15 has a fixture 17 attached thereto which is adapted for connection to either a relatively fixed support or a movable load device, not shown. Suitable sealing means are provided between the aperture in cap member 13 and the projecting piston rod 15. The cap member 12 is likewise provided with a fixture portion 18 adapted for connection to either a relatively fixed support or a movable load device. In the disclosure shown in Fig. 1, it is preferred to connect fixture 17 to the fixed support and the fixture 18 to the movable load device for a reason which will appear more fully hereinafter.

The piston 14 is generally of cup-shaped configuration and has an annular friction surface 19 bonded to the inner bottom wall thereof. Rotatably journaled within the hollow cup-shaped portion of the piston 14 by bearing means 20 is a nut element 21. The outer race 22 of the bearing 20 is retained in position between an inwardly extending annular shoulder 23 of the piston 14 and an annular ring 24 which threadedly engages a portion of the inner periphery of the piston. The inner race 25 of the bearing 20 is retained between a shoulder on the nut 21 and an annular ring 26 threadedly engaging a portion of the outer periphery of the nut. The inner periphery of the nut 21 has formed thereon a spiral groove 27 of substantially semi-circular configuration, the nut forming one element of the ball-screw and nut connection to be described. In addition the nut 21 has an annular shoulder 28 thereon, the outer periphery of which is straight splined as at 29. A locking collar 30, having a straight splined portion 31 in engagement with the straight splined portion 29 of the shoulder 28, is disposed between the bottom wall of the cup-shaped piston portion and the end surface of the nut. A compression spring 32, mounted between the shoulder 23 of the piston and the locking collar 30, normally urges the locking collar into engagement with the friction surface 19. The locking collar and the friction surface constitute the locking means which prevent movement of the piston 14 relative to the cylinder 11 in the absence of fluid pressure application to either the retract chamber 33 or extend chamber 34 of the actuator cylinder. It is to be understood that any type of locking means may be used, such as a dog tooth arrangement, and the friction type locking means disclosed, is to be construed only by way of example and not by way of limitation.

The piston rod 15 which is coaxially disposed within the cylinder 11, has a hollow portion within which a tubular member 35 is coaxially positioned. One end of the tubular member 35 is securely attached to a portion of the locking collar 30. The other end of the tubular member 15 has secured thereto a disc 36 having an opening 37 therein. The tubular member 35 is adapted for axial movement relative to the piston rod 15 under the urge of a lock release piston 38 disposed within a lock release cylinder 39 formed adjacent the free end of the piston rod 15. The piston 38 has an axially extending rod portion 40 adapted to engage the disc 36 for effecting axial movement of the tubular member 35 and the locking collar 30. The rod portion 40 projects through an end wall 41 of the cylinder 39, suitable sealing means being provided between contiguous surfaces of the rod 40 and the end wall 41. Suitable sealing means are likewise provided between the engaging surfaces of the piston 38 and the walls of cylinder 39. A chamber 42 of the lock release cylinder 39 is connected by means of a passage 43 in the rod 15 into a passage 44 in a housing member 45 attached to the piston rod. The housing 45 has a second passage 46 therein which communicates with a passage 47 formed in the piston rod, the passage 47 communicating with the opening 37 in the disc 36 and thence through the tubular member 35, the hollow screw shaft 48, a passage 49 and to the extend chamber 34. The retract chamber 33 has connection with a port 50 formed in the cap member 13. Any suitable valve means (not shown), such as the type disclosed in copending application, Serial No. 338,348, filed February 24, 1953, which application is a continuation of forfeited application Serial No. 258,938, filed November 29, 1951, in the name of James W. Light, may be utilized to control the flow of pressure fluid to and from the actuator chambers as well as to the lock release cylinder.

The hollow screw shaft 48 is rotatably journaled by bearing means 51 within the cap member 12. The outer race 52 of bearing means 51 is suitably retained between shoulders on the cap member 12 and an annular member 53, while the inner race 54 of the bearing is retained in position between a shoulder formed on the shaft 48 and a ring 55 threadedly engaging a portion of the screw shaft. The outer periphery of the screw shaft is formed with a complementary spiral groove of substantially semi-circular configuration, the shaft extending through the nut 21 and into the tubular member 35. A plurality of balls 56 are utilized as a coupling between the screw shaft and the nut, thereby affording a substantially frictionless coupling therebetween. A tubular member 57 attached to the nut 21 is utilized as a circulation passage for the balls 56 during relative rotary movement between the nut and screw shaft. The nut 21, the shaft 48 and the balls 56 constitute the well known ball-screw and nut connection.

Figure 2:
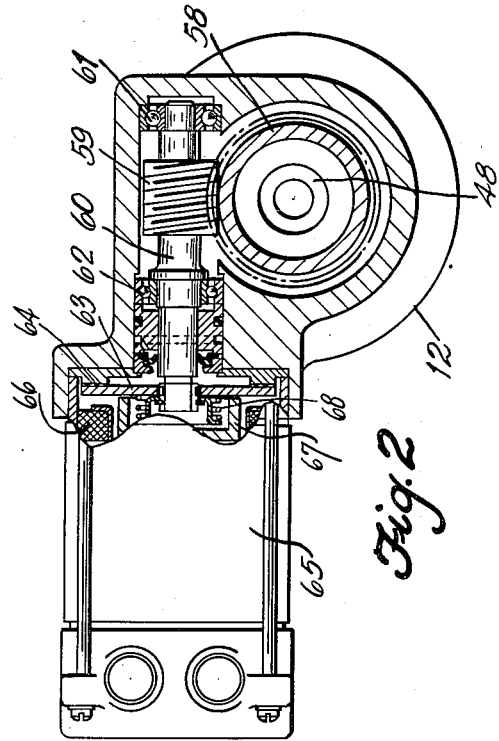
Fig. 2 is a view likewise partly in section and partly in elevation taken along the line 2—2 of Fig. 1.

The end portion of the screw shaft 48 disposed within cap member 12, is formed as a worm gear 58 having engagement with a worm 59. With particular reference to Fig. 2, the worm 59 is anchored to a shaft 60 journaled by bearing means 61 and 62 within the cap member 12. The shaft 60 has attached thereto at one end a disc 63. The disc 63 is composed of magnetic material and forms a component part of a magnetic clutch to be described. The disc 63 may be keyed to the shaft 60 such that relative rotation between the disc and the shaft is precluded, but the disc may move axially relative to the shaft. One side of the magnetic disc 63 is frictionally engageable with a braking disc 64 secured within a portion of the cap member 12. The braking disc 64 is restrained from rotation. A reversible electric motor is disposed within a housing 65 attached to the end cap 12. Also disposed within the housing 65 is an electromagnet 66. The construction of the motor and electromagnetic clutch assembly is more particularly disclosed in my copending application, Serial No. 247,737, filed September 21, 1951, now Patent No. 2,620,683, issued December 9, 1952, and suffice it here to say that the rotatable shaft of the electric motor (not shown) has a cup-shaped element 67 attached thereto which is rotatable within the magnetic field established by the electromagnet 66. When the electric motor within housing 65 is deenergized by any suitable switch means, not shown, the electromagnet 66 is likewise deenergized and a spring 68 will urge the magnetic disc 63 away from the cup-shaped member 67 into frictional engagement with the braking disc 64. Thus, when the motor is deenergized, shaft 60 is restrained against any rotative movement, the shaft 60 thereby preventing rotative movement of the screw shaft 48 within the actuator cylinder at all times when the motor is deenergized. When the electric motor and electromagnet are energized, the magnetic field, created by the electromagnet, will attract magnetic disc 63 rotatably secured to the shaft 60, and the disc 63 will move into engagement with the cup 67 which is being rotated by the electric motor. Rotation of the disc 63 by the cup 67 and its associated motor will likewise effect rotation of the shaft 60 and the gear train 59 and 58.

*Operation*

As heretofore mentioned, fluid under pressure is utilized as the primary motivating means while the electric motor is only utilized if and when the fluid pressure system (not shown) for operating the actuator becomes inoperative. During fluid pressure operation of the actuator, fluid under pressure is preferably concurrently admitted to one of the actuator chambers and the lock release chamber 42, while the other actuator chamber is exposed to drain. When fluid under pressure is admitted to the lock release chamber 42, the piston 38 will move to the left, as viewed in the drawing, thereby effecting movement of the tubular member 35 and the locking collar 30 to the left. Thus the locking collar is moved out of engagement with the friction surface 19 and the nut 21 is free to rotate relative to the piston 14. Accordingly, when fluid under pressure is admitted to either the retract chamber 33 or the extend chamber 34, the piston 14 will undergo linear movement relative to the cylinder 11 by reason of the concurrent application of pressure to one side thereof and exposure of the other side thereof to drain. Linear movement of the piston is permitted in that the nut 21 is free to rotate relative to the then fixed screw shaft 48. Thus, it is apparent that reciprocative movements of the piston 14 within the cylinder 11 may be affected by pressure fluid when the lock release piston 38 has moved to the left to disengage the locking collar 30 from the friction surface 19. As soon as the valve means, not shown, are actuated to stop the flow of pressure fluid to either of the actuator chambers, lock release chamber 42 is exposed to drain whereupon spring 32 will move the locking collar 30 into engagement with the friction surface 19 and the tubular member 35 will reposition the tubular member 35 and the lock release piston 38 to the position shown in Fig. 1. Accordingly, relative rotation between the nut 21 and the piston 14 is precluded inasmuch as the piston 14 cannot rotate within the cylinder 11 due to the connection of the piston rod 15 to a fixed support. In the design, it is preferred to connect the piston rod 15 to a relatively fixed support inasmuch as hydraulic connections must be made through the piston rod.

Should the fluid pressure system become inoperative for any reason, the actuator piston 14 may be reciprocated by energization of the electric motor. When the electric motor is energized, the electromagnetic clutch, heretofore described, is likewise energized and rotation will be imparted to the shaft 60, which rotation is transmitted through the worm 59 and the gear 58 to the screw shaft 48. As the locking means, constituted by the locking collar 30 and the friction surface 19, are now in engagement, relative rotation between the nut 21 and the screw shaft 48 will effect linear movement of the nut and piston as an assembly relative to the cylinder 11, the direction of movement being dependent upon direction of rotation of the screw shaft. Thus, a reversible electric motor is conveniently used to effect rotation of the screw shaft 48 in either direction. However, it is to be understood that an unidirectional electric motor could be used if reversible gearing means were provided.

With an actuator of the present design, it is readily apparent that, in the absence of fluid pressure application to the cylinder, and while the electric motor is deenergized, movements of the piston 14 relative to the cylinder 11 are prevented by the locking means. When the fluid under pressure is used as the motivating means, the locking means must be released to permit relative rotation between the nut and screw shaft. However, when the electric motor is used as the motivating means, the locking means must be engaged or locked to permit relative rotary movement between the screw shaft and the nut. It is further apparent that reciprocable movements of the piston 14 within the cylinder 11 can only be effected by relative rotary movement between the nut and the screw shaft and that when the electric motor is driving the screw shaft, the piston 14 experiences linear movement through the operative locking means.

While the embodiment of the present invention as herein disclosed, constitutes a preferred form, it is to be understood that other forms might be adopted.

What is claimed is as follows:

1. A dual drive actuator including in combination, a cylinder having a lineally movable piston disposed therein capable of fluid pressure actuation in either direction, releasable locking means operatively associated with said piston for preventing movement of said piston when no fluid pressure is exerted thereon, and auxiliary driving means operatively connected to said piston for effecting linear movement thereof in either direction in lieu of fluid pressure actuation, the operative connection between said piston and said auxiliary means including an internally threaded nut rotatably journaled in said piston, the said locking means in the locked condition, and an externally threaded shaft disposed in said cylinder and threadedly engaging said nut whereby relative rotation will occur between said shaft and nut upon linear movement of said piston.

2. A dual drive actuator including in combination, a cylinder having a lineally movable piston disposed therein capable of fluid pressure actuation in either direction, locking means operatively associated with said piston for preventing movement of said piston when no fluid pressure is exerted thereon, means operative upon application of fluid pressure to said cylinder for releasing said locking means to permit linear movement of said piston in either direction, and auxiliary driving means operatively connected to said piston for effecting linear movement thereof in either direction in lieu of fluid pressure actuation, the operative connection between said piston and said auxiliary means including an internally threaded nut rotatably journaled in said piston, the said locking means in the locked condition, and an externally threaded shaft disposed in said cylinder and threadedly engaging said nut whereby relative rotation will occur between said shaft and nut upon linear movement of said piston.

3. A dual drive actuator including in combination, a cylinder having a lineally movable piston disposed therein capable of fluid pressure actuation in either direction, releasable locking means operatively associated with said piston for preventing movement of said piston when no fluid pressure is exerted thereon, and auxiliary driving means operatively connected to said piston for effecting linear movement thereof in either direction in lieu of fluid pressure actuation, the operative connection between said piston and said auxiliary means including an internally threaded nut rotatably journaled in said piston, the said locking means in the locked condition, and an externally threaded shaft rotatably journaled in said cylinder and threadedly engaging said nut whereby relative rotation will occur between said shaft and nut upon linear movement of said piston, said driving means, when inactive, maintaining said locking means operative to prevent piston movement when no fluid pressure is exerted on said piston by restraining rotation of said shaft and, when active, operative to rotate said shaft with the locking means in the locked condition.

4. A dual drive actuator including in combination, a cylinder having a lineally movable piston disposed therein capable of fluid pressure actuation in either direction, locking means operatively associated with said piston for preventing movement of said piston when no fluid pressure is exerted thereon, means operative upon application of fluid pressure to said cylinder for releasing said locking means to permit linear movement of said piston in either direction, and auxiliary driving means operatively connected to said piston for effecting linear movement thereof in either direction in lieu of fluid pressure actuation, the operative connection between said piston and said auxiliary means including an internally threaded nut rotatably journaled in said piston, the said locking means in the locked condition, and an externally threaded shaft rotatably journaled in said cylinder and threadedly engaging said nut whereby relative rotation will occur between said shaft and nut upon linear movement of said piston, said driving means, when inactive, maintaining said locking means operative to prevent piston movement when no fluid pressure is exerted on said piston by restraining rotation of said shaft and, when active, operative to rotate said shaft with the locking means in the locked condition.

5. A dual drive actuator including in combination, a cylinder having a lineally movable piston disposed therein capable of fluid pressure actuation in either direction, releasable locking means operatively associated with said piston for preventing movement of said piston when no fluid pressure is exerted thereon, a first element attached to said piston and projecting through one end wall of said cylinder, a second element attached to the other end wall of said cylinder, one of said elements being constructed and arranged for connection to a relatively fixed support, the other of said elements being constructed and arranged for connection to a relatively movable load device whereby relative linear movement between said piston and said cylinder will effect adjustment of said load device, and auxiliary driving means operatively connected to said piston for effecting linear movement thereof in either direction in lieu of fluid pressure actuation, the operative connection between said piston and said auxiliary means including an internally threaded nut rotatably journaled in said piston, the said locking means in the locked condition, and an externally threaded shaft disposed in said cylinder and threadedly engaging said nut whereby relative rotation will occur between said shaft and nut upon linear movement of said piston.

6. An actuator including in combination, a cylinder, a reciprocably movable piston in said cylinder capable of fluid pressure actuation in either direction, a rod disposed in said cylinder and operatively connected to said piston, the operative connection between said piston and rod including an element journaled in said piston for rotation relative thereto whereby relative rotation will occur between said element and said rod in response to linear movement of said piston, releasable locking means operatively associated with said piston for holding it against movement when no fluid pressure is exerted upon said piston, and auxiliary driving means operatively connected with said rod for effecting linear movement of said piston in either direction, said auxiliary means, when inactive, maintaining said locking means operative to prevent piston movement in the absence of fluid pressure application thereto and, when active, operative to rotate said rod with the locking means in the locked condition.

7. The combination set forth in claim 6 wherein the auxiliary driving means comprises a reversible electric motor.

8. An actuator including in combination, a cylinder, a reciprocably movable piston in said cylinder capable of fluid pressure actuation in either direction, a threaded rod disposed in said cylinder and operatively connected to said piston, the operative connection between said piston and rod including a nut journaled in said piston for rotation relative thereto whereby relative rotation will occur between said element and said rod in response to linear movement of said piston, locking means operatively associated with said piston for holding it against movement when no fluid pressure is exerted upon said piston, means for releasing said locking means upon application of fluid pressure to said cylinder, and auxiliary driving means operatively connected with said rod for effective linear movement of said piston in either direction, said auxiliary means, when inactive, maintaining said locking means operative to prevent piston movement in the absence of fluid pressure application thereto and, when active, operative to rotate said rod with the locking means in the locked condition.

9. The combination set forth in claim 8 wherein the locking means include a first brake member rotatably connected to the nut but movable longitudinally relative thereto, a second brake member immovably attached to said piston, and resilient means normally urging said brake members into engagement thereby precluding rotation of the nut relative to the piston.

10. The combination set forth in claim 9 wherein the means for releasing the locking means include a tubular element attached to the movable brake member and capable of longitudinal movement relative to the piston, a lock release cylinder, and a lock release piston in said lock release cylinder capable of fluid pressure actuation to effect movement of said tubular element and movable brake member to disengage said brake member upon application of fluid pressure to said actuator cylinder whereby the movable brake member and the nut are free to rotate relative to the piston.

11. An actuator including in combination, a cylinder, a lineally movable piston in said cylinder capable of fluid pressure actuation in either direction, a member disposed within said cylinder and operatively connected to said piston, the operative connection between the piston and the member including an element rotatably journaled in said piston such that relative rotation will occur between said element and said member in response to linear movement of said piston, releasable locking means operatively connected with the piston for holding said piston against movement when no fluid pressure is exerted upon said piston, and auxiliary driving means operatively connected with said piston for effecting linear movement of said piston in either direction, said auxiliary means, when inactive, maintaining said locking means operative to prevent piston movement and, when active, operative to effect piston movement with the locking means in the locked condition.

12. An actuator including in combination, a cylinder, a lineally movable piston in said cylinder capable of fluid pressure actuation in either direction, a hollow member rotatably journaled in said cylinder and operatively connected to said piston, the operative connection between the piston and the member including an element rotatably journaled in said piston such that relative rotation will occur between said element and said member in response to linear movement of said piston, releasable locking means operatively connected with the piston for holding said piston against movement when no fluid pressure is exerted upon said piston, and auxiliary driving means operatively connected with said piston for effecting linear movement of said piston in either direction, said auxiliary means, when inactive, maintaining said locking means operative to prevent piston movement, and when active, operative to effect piston movement with the locking means in the locked condition.

13. An actuator assembly including, in combination, a cylinder, a reciprocative piston in said cylinder, an element rotatably journaled in said cylinder and normally restrained against rotation, said element being operatively connected to said piston, the operative interconnection between said piston and element including a hollow member journaled for rotation within said piston, said element extending through said hollow member and operatively engaging the same whereby relative rotation will occur between said member and element upon reciprocative movement of said piston, and releasable locking means operatively associated with said hollow member for restraining rotation of said hollow member and, consequently, preventing reciprocal movements of said piston when the actuator is inactive.

HOWARD M. GEYER.

No references cited.